March 2, 1954   E. WILDHABER   2,670,614
UNIVERSAL JOINT DRIVE
Filed Dec. 28, 1951   3 Sheets-Sheet 2

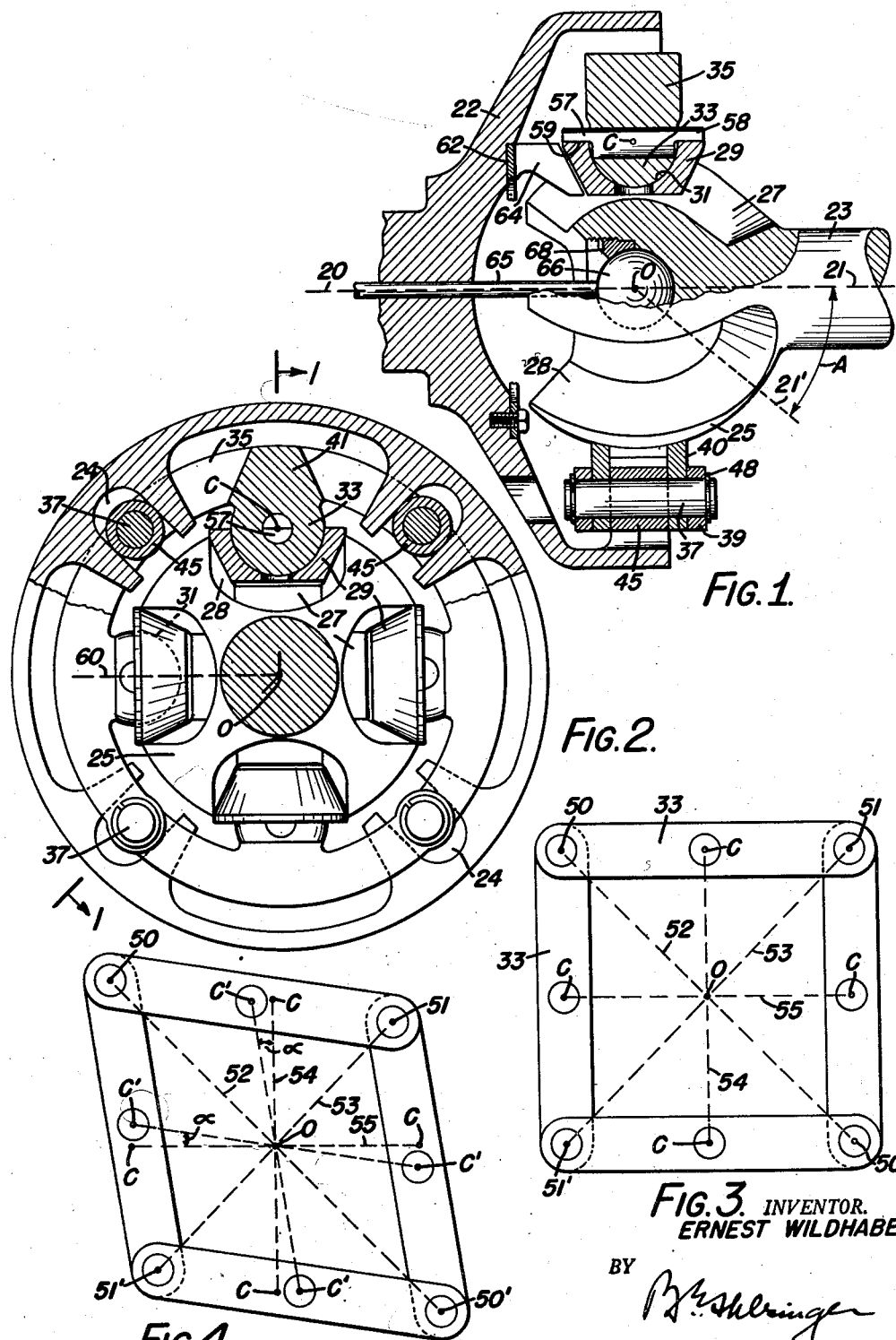

INVENTOR.
ERNEST WILDHABER
BY
ATTORNEY

March 2, 1954 E. WILDHABER 2,670,614
UNIVERSAL JOINT DRIVE
Filed Dec. 28, 1951 3 Sheets-Sheet 3
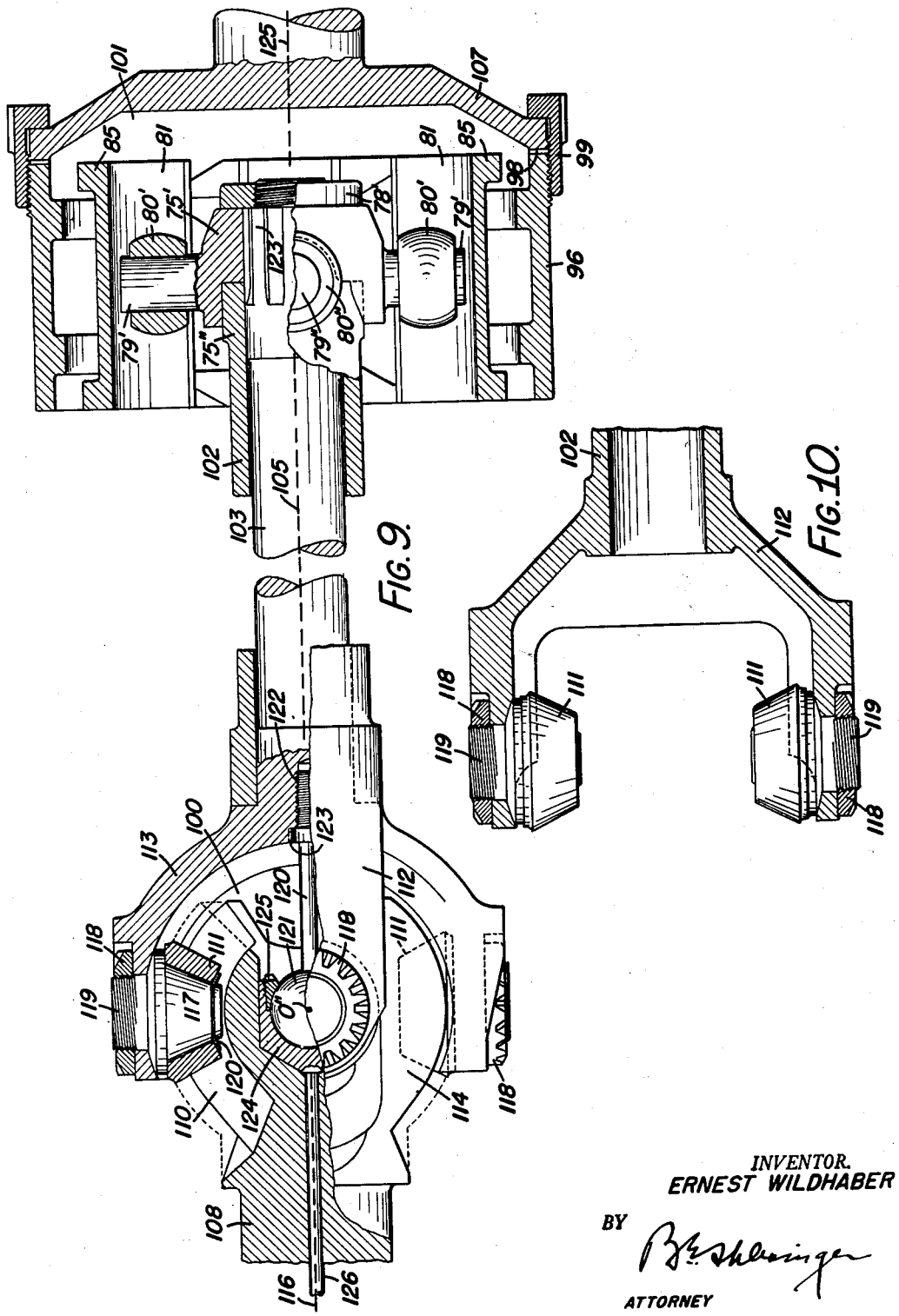
INVENTOR.
ERNEST WILDHABER
BY
ATTORNEY

Patented Mar. 2, 1954

2,670,614

UNITED STATES PATENT OFFICE 2,670,614

UNIVERSAL JOINT DRIVE

Ernest Wildhaber, Rochester, N. Y.

Application December 28, 1951, Serial No. 263,717

22 Claims. (Cl. 64—21)

The present invention relates to universal joints and to universal joint drives, and more particularly to universal joints of the constant velocity type and to universal joint drives comprising two or more joints which transmit substantially uniform motion. In a still more specific aspect, the invention relates to universal joint drives in which the individual joints comprise the equivalent of two concentric Cardan joints of ninety degree phase difference.

Cardan type joints transmit motion of varying velocity. When the two shafts connected by the joints have their axes angularly disposed to one another the transmitted motion fluctuates periodically and repeats twice for each revolution. When two Cardan type joints are concentric and have a phase difference of ninety degrees, the fluctuations of the motions transmitted by the two joints are opposite and substantially equal with the result that the average motion is very nearly uniform.

Various means may be used for connecting the two concentric joints to attain this average nearly uniform motion. In my pending application Serial No. 123,561, filed October 26, 1949, the use of a plane linkage is disclosed for this purpose. It is a four-bar linkage with four bars of equal length. The same kind of linkage is used in the embodiments of the present invention specifically illustrated in the accompanying drawings.

Each of the two concentric Cardan-type joints of a complete joint formed in accordance with my present invention comprises a pair of ways and a pair of rollers or sliding blocks engaging said ways and adapted to turn about a common axis radial to one of the two axes connected by the joint. The rollers or sliding blocks are mounted on carrier members. In the universal joint disclosed in my application Serial No. 123,561 above mentioned, the carrier members are pivotally attached to the four-bar linkage. In a joint constructed according to the present invention, one or other of the two sets of elements, either the carrier members or the ways, are a direct part of the linkage, that is, the bars of the four-bar linkage contain either the ways or the pivots on which the rollers or blocks are mounted.

One object of the present invention is to provide a simplified design for a universal joint, that is adapted to transmit substantially uniform motion, and a simplified design for a universal joint drive having two or more joints.

Another object of the invention is to provide a more rugged constant velocity type universal joint capable of use alone or in a universal joint drive comprising two or more joints.

Another object of the invention is to provide an equalizing mechanism for a universal joint, comprising two concentric Cardan-type joints, which is of simplified design and greater rigidity.

Other objects of the invention will be apparent hereinafter from the specification and from the recital of the appended claims.

In the drawings:

Fig. 1 is a part side elevation, part axial section of a universal joint constructed according to one embodiment of the present invention, the section being taken on the line 1—1 of Fig. 2 looking in the direction of the arrows;

Fig. 2 is part transverse section, part end view of the joint shown in Fig. 1;

Figs. 3 and 4 are diagrammatic views explanatory of the operation of the linkage used in the illustrated embodiment of the present invention;

Fig. 9 is a part axial section, part elevation of a universal joint drive constructed according to one embodiment of the present invention; and Fig. 10 is an axial section of the outer fork or roller carrier used in the joint shown at the left in Fig. 9.

Figure 5:
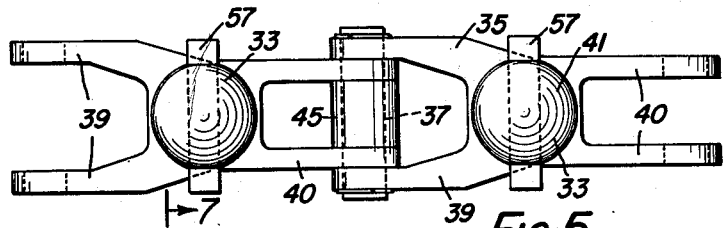
Fig. 5 is a view showing in development a portion of the linkage used in Figs. 1 and 2.

In the drawings the joints are shown in alignment, that is, in a position of zero shaft angularity. Thus, in the embodiment of the invention shown in Figs. 1 and 2 the axes 20 and 21 of the two end members 22 and 23 of the joint coincide. In use, however, the axes 20 and 21 may be inclined at different angles to one another. 21' denotes one position of the axis 21 in which that axis is at an angle A to the axis 20 of end member 22.

In this embodiment of the invention the outer end member 22 of the joint is an internal member. It has four internal, radial slots 24 in it which are open at their inner ends.

The inner end member 23 has an enlarged head 25 of generally spherical shape in which are provided four guideways 27. These are curved about a common center O located at the point of intersection of the axes 20 and 21 of the two end members of the joint. The sides 28 of the guideways 27 are surfaces of revolution, specifically, conical surfaces.

These sides 28 are engaged by conical rollers 29 whose apices are at O or approximately at O. The sides of the guideways 27 converge to the point O.

Each roller 29 is provided with a hemispherical recess 31 forming a bearing surface; and each roller 29 is mounted upon a spherical projection 33 which fits into the recess 31 of the roller and whose center is at C. Each projection 33 is formed integral with a bar 35. There are four bars 35. The four bars are equal in length; and together they constitute an endless, that is, closed, chain or linkage with four bars or links. Adjacent bars are connected by pivot pins 37 having parallel axes. Two connected bars are shown in Fig. 5 in a development such that the axes of their link pivots all lie in the drawing plane. Each bar has a general H shape. It comprises two bifurcated parts 39 and 40, respectively, which project from opposite sides of a central connecting portion 41 that contains the spherical projection 33. The sphere center C of each bar 35 is disposed in line with and midway between the two pivotal axes of the bar.

A roller 45 (Figs. 2 and 5) is mounted on each link pin 37 between the arms or furcations 39 and 40 of the two bars that are connected by that link pin. The four rollers 45 of the linkage engage in the four radial slots 24 of the outer member 22, one roller engaging in each slot.

The rollers are held against axial movement in the slots by the forked arms 40. The pins 37 are secured against axial movement in the arms 40 by snap-rings 48 (Fig. 1). The rollers 45 are free to move radially in the slots 24 while being held against axial movement therein. More broadly, the link pivots 37 are constrained to move in predetermined paths relative to the outer member 22.

The link action will now further be described with reference to Figs. 3 and 4. Fig. 3 shows a central position of the four-bar linkage. Since the bars are of equal length the four bars here form a square. Here the lines OC drawn from the centers C of the rollers to the center of the linkage are at right angles to one another. The axes 50 and 51, 50' and 51', of the link pivots are constrained by slots 24 to move along diagonal straight lines 52 and 53 which are at right angles to one another. How the centers C of the links are displaced in other positions of the linkage is shown in Fig. 4. As the link pivot axes 50 and 50' move outwardly on the line 52, the axes 51 and 51' move inwardly on the line 53 and the centers C move to the positions C'. As well known, the point C' has the same distance from the center O as the point C. In other words, the point C moves to point C' in a circular arc about the center O through an angle $a = COC'$. In this movement the line of centers 54 moves counterclockwise about center O while the line of centers 55 moves clockwise about center O. The two opposite angles of the two lines are equal. The advance of one is equal to the lag of the other.

It is seen that the linkage permits a pair of diametrically opposite rollers 29 with centers C to move about O through any angle $a$ provided that the other pair of diametrically opposite rollers 29 and centers C move oppositely about center O through the same angle $a$. This motion is relative to the outer end member 22 of the joint. The turning angle of the centers C of one pair of rollers is thus equal to the turning angle $\theta$ of member 22 plus angle $a$ or $(\theta+a)$. The turning angle of the centers C of the other pair of rollers is then equal to the difference of the turning angle of member 22 less angle $a$ or $(\theta-a)$. The turning angle of the member 22 is the average of the two turning angles $(\theta+a)$ and $(\theta-a)$ of the centers of the two pairs of rollers, that is, $\theta$.

As each roller center C moves about center O the apex of its conical roller 29 remains at O. In the transverse plane of Fig. 2 it is kept there through engagement of the roller with the engaged conical side of its guideway 27. In the axial plane of Fig. 1, each roller is kept there by a semi-cylindrical rocking pin 57 which is mounted in spherical portion 33 of the associate link bar 35 and whose axis passes through center C and is parallel to the axis of link pivot 37. This pin 57 has recessed ends 58 with plane undersurfaces 59 that lie in the same plane as axis C. These bear against the plane end face of the associated roller 29. This end face passes through center C and is perpendicular to the axis of the conical roller surface.

The rocking pin 57 prevents lateral tipping of the roller about an axis perpendicular to the drawing plane of Fig. 1. Yet it permits tipping of the roller on its spherical seat about an axis coinciding with the pin axis as required to keep the roller axis passing through the centers O. It also permits free turning motion of the roller. The axis of each conical roller 29 is, therefore, maintained in a plane perpendicular to the axis 20 of the end member 22 and passing through center O.

Accordingly, the common axis of a pair of rollers is perpendicular to the axis 20 of an end member of the joint and passes through center O. The axis 60 (Fig. 2) of the ways engaged by said pair of rollers is perpendicular to the axis 21 of the other end member of the joint; and the angle between the roller axis and the axis 60 is a right angle and stays a right angle.

These right angle relationships are the characteristics of the Cardan joint. An individual joint, made up of a pair of rollers with holders and a pair of guideways in engagement with these rollers, is therefore understood to transmit exactly the same motion as the Cardan joint. It is a Cardan-type joint. Each of these joints, therefore, transmits the known motion of the Cardan joints. It is a motion which fluctuates increasingly with increased shaft angularity, and which repeats twice per turn. That is, its cycle is 180° of the turning angle.

The present joint contains two concentric Cardan-type joints. These have a phase difference of 90° since their ways 27 in head 25 are 90° apart. Since their phase difference is 90° the two joints transmit oppositely fluctuating motion. When one pair of coaxial rollers 29 is advanced beyond the position of uniform motion the other pair of coaxial rollers 29 lags back of said position by substantially the same angle. The average motion is, therefore, very nearly uniform. End member 22 has this average motion. Hence essentially uniform motion is transmitted between end members 22 and 23 or 23 and 22.

Secured to the end member 22 (Fig. 1) is a ring shaped part 62 with four relatively thin axial projections 64. The end profiles of these projections closely follow the surfaces of the rollers 29. This member 62 serves to retain the rollers 29 during assembly or dis-assembly of the joint, that is, it prevents the rollers 29 from dropping out before the head 25 is in place or after it has been removed.

Centering between the two end members is done by the four roller contacts. No additional centering means is required. However, it is necessary to prevent relative axial displacement. That is, the joint of Figs. 1 and 2 has to be kept together so that the center O of the ways is kept in the plane of the roller axes. To this end a thin stemmed member 65 (Fig. 1) with a ball end 66 is provided. The ball end 66 is mounted in a spherical bearing made up of a hemispherical recess provided in the end member 23 and of a nut 68 that is secured to said end member. The bearing and ball are centered at O. The thin stem of the member 65 permits lateral deflection so that the ball joint readily accommodates itself to prevent axial displacement of the joint members relative to one another.

The stem of member 65 extends through a bore in the end member 22. It is secured at its outer end (not shown) against rotation as well as against axial movement relative to end member 22.

To dis-assemble the joint, the member 65 is first disconnected at its outer end from end member 22. Then the head 25 can be withdrawn axially together with the stem member 65.

While stemmed member 65 constitutes a preferred means for preventing relative axial displacement of the two end members 22 and 23 of the joint, any other suitable known means may be used instead. Also, the manner of mounting the rollers 29 on the bars 35 of the linkage, and even the shape of the rollers may be varied within the scope of the invention.

Figure 6:
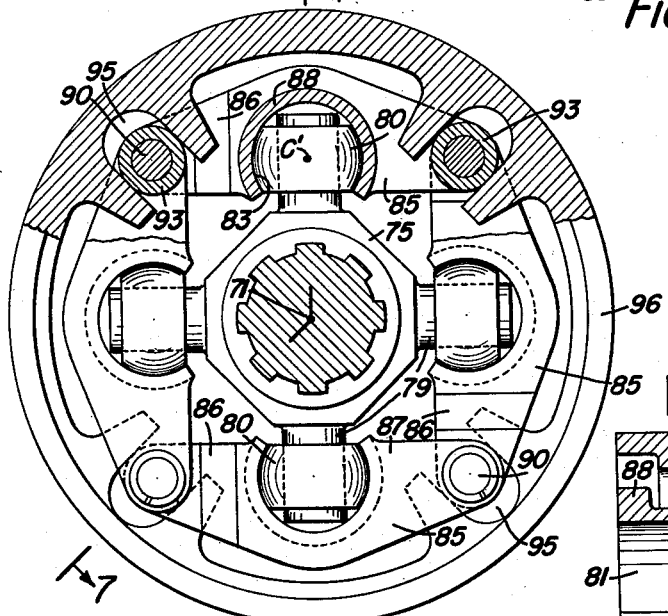
Fig. 6 is a part end view, part transverse section along the line 6—6 of Fig. 7 looking in the direction of the arrows and showing a universal joint constructed according to another embodiment of this invention.
Figure 7:
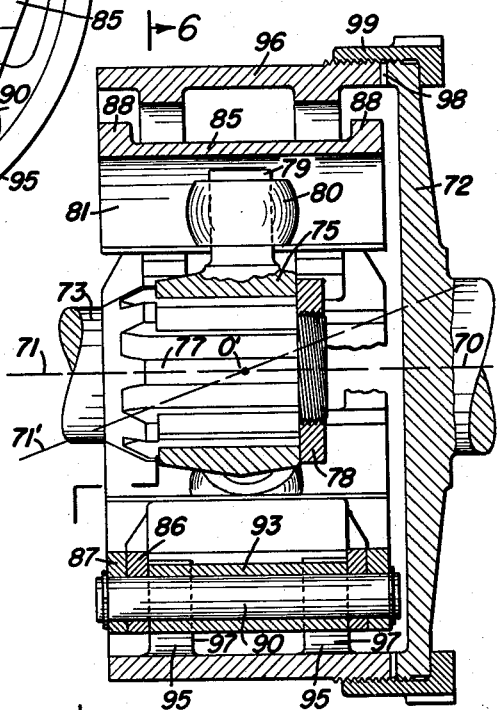
Fig. 7 is a section along the line 7—7 of Fig. 6, looking in the direction of the arrows.
Figure 8:
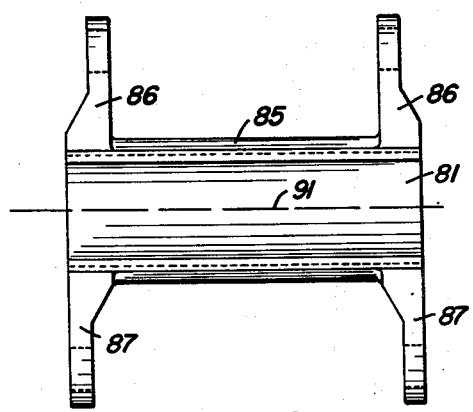
Fig. 8 is a view of one of the linkage bars used in the embodiment of the invention shown in Figs. 6 and 7.

A further embodiment of the invention is shown in Figs. 6 to 8 inclusive. Here an axially free joint is shown, that is a joint in which the two end members 72 and 73 are capable of relative axial displacement. The axes 70 and 71 of these two end members intersect in a point such as O' in one axial position of the end members. The center O' may shift, however, lengthwise of the axis 70. 71' denotes another position of the axis 71 when the two end members have their center as shown at O' but have their axes angularly disposed to one another.

The end member 73 comprises a splined shaft to which there is secured a spider or holder 75 by means of splines 77 and a nut 78. This nut threads on the end of the shaft 73.

The spider 75 has a hub portion from which project four radial cylindrical pivot pins 79. These pivot pins are equi-angularly spaced and their axes are at right angles to axis 71 and intersect said axis at O'.

Rotatably mounted on the pivots 79 are spherical rollers 80. These rollers are free to move axially on their pivots. They engage axially straight guideways 81 that extend parallel to the axis 70 of end member 72. Each guideway comprises an internal cylindrical working surface whose profile 83 (Fig. 6) is a circular arc open at the inside. Each guideway is formed on a member 85 which has the general shape of the letter H, see Fig. 8.

The members 85 constitute the members of a four-bar linkage, the bars being of equal length. Each member has two axially-spaced, parallel arms 86 projecting at right angles from one side of it at opposite ends of the guideway 81 and two axially-spaced parallel arms 87 projecting at right angles from the opposite side of it at opposite ends of guideway 81. In line with the arms 86 and 87 are the reinforcing ribs 88 (Fig. 7) which extend in an arc about the circular profile of the guideway portion.

Adjacent bars of the four-bar linkage are connected to each other by link pivot pins 90 which are parallel to the axis 91 of the cylindrical guideway 81 and at equal distances therefrom.

The four-bar linkage is the same in operation as described with reference to Figs. 3 and 4. It differs from the linkage described in Figs. 1 and 2 merely in the fact that it is wider, that is, the arms 86 and 87, respectively, are spaced a greater distance from each other. Also the bar 85 contains a guideway while in the embodiment of Figs. 1 and 2 bar 35 mounts a roller 29. The action of the linkage 85 proper is, however, the same. Each link pivot 90 carries a long roller 93 coaxial therewith. These rollers 93 engage radial slots 95, similar to slot 24, provided internally in an outer member 96, that is similar to end member 22. The rollers 93 are held in said slots 95 and guided thereby. Each roller 93 is thus constrained to move in a radial path. To save weight the slot 95 for each roller is provided in axially-spaced parallel arms 97.

The outer member 96 is rigidly connected to the end member 72 of the joint. It is secured thereto by a toothed face coupling 98 of known design which is held in coupled position by a large nut 99 that threads onto the outer member 96.

The linkage of Figs. 6 to 8 acts as shown in Figs. 3 and 4 so that the inclination of a bar 85 changes with respect to the radial axis O'C' of its roller 80. The spherical shape of the rollers 80 permit such inclination changes. As in the previously described embodiment of the invention, the plane of the axes of a pair of diametrically opposite cylindrical guide surfaces 83 receive the motion transmitted in a Cardan joint at the given shaft angularity and phase. In operation at shaft angularity, the linkage moves slightly, repeating its motion with each half turn. One pair of diametrically opposite link pivots 90 moves outwardly in their radial slots 95 while the other pair of diametrically opposite link pivots 90 move inwardly. Then the first named pair of link pivots move inwardly while the other pair move outwardly. A motion cycle with outward and inward motion of the link pivots is completed in half a turn of the joint, and then starts over again. The average motion of the axes of the two pairs of guide surfaces 83 is transmitted to the outer member 96. It is very nearly uniform.

Figs. 9 and 10 illustrate one embodiment of a universal joint drive constructed in accordance with the present invention. This drive contains two spaced universal joints, a high angle joint 100 at the left, and a joint 101 at the right designed for more limited shaft angularity. The latter is also designed to have freedom of axial movement. One application of this drive is to power-driven front wheels of an automotive vehicle. The high angle joint is then set in line with the front wheel pivot or knuckle.

The drive is of the kind disclosed in principle in my applications Serial Nos. 102,788 and 123,561, filed July 2, 1949 and October 26, 1949, respectively. In this drive a single equalizer is used for both joints, that is, a single linkage. The four-bar linkage provided at joint 101 will do for both joints 100 and 101. It makes both joints constant velocity joints within close tolerances. That is, the drive transmits uniform motion at all angles within design limits of either joint. Nor do these angles have to be in the same plane or in any way related to each other. One condition for this performance is the location of the equalizer, that is, the four-bar linkage. It has to be on one of the two end members of the joints. Another condition is the provision of a dual drive between the two joints. This is accomplished through the use of a pair of concentric shafts.

The universal joint drive shown has two end members, namely, end member 108 at joint 100 and end member 107 at joint 101.

Novelty of this drive resides in part in the joint 101. This joint is a direct adaptation of the joints of Figs. 6 to 8 to a dual drive. Instead of having a single spider 75 with four equally spaced radial pivots 79 to carry rollers 80, however, here there are two roller carriers or holders 75', 75'' each containing a pair of coaxial radial pivots 79', 79''. These are rigid with coaxial shafts 103 and 102, respectively, the holder 75' having splined connection with the shaft 103 and the holder 75'' being integral with the hollow shaft or tube 102. The holders 75', 75'' may, therefore, oscillate relative to each other about their common axis 105, that is, about the common axis of the shafts.

The rollers 80' and 80'' engage in the guideways 81 of bars 85 similar to those described with reference to Figs. 6 and 7. These bars form part of a four-bar linkage, as described with reference to Figs. 6 and 7 and are mounted in a member 96 and may be secured by a coupling 98 and a nut 99 to the end member 107, which is similar to end member 72. A nut 78' may secure the holder 75' on the shaft 103.

There is also novelty in the joint 100 in that the end member 108 of the drive contains curved ways 110, and in that two pairs of tapered rollers 111 are mounted on forked holders 112 and 113, respectively, rigid with the shafts 102 and 103, respectively. The end member 108 of the drive has an enlarged head 114 with guideways or grooves 110. These are like the guideways 27 of the head 25 shown in Figs. 1 and 2. These ways have tapered side profiles converging toward the inside. Their side surfaces are surfaces of revolution described about a common axis which passes through the center O''. This center is the intersection point of the joint axes 116 and 105; and the axis of the surfaces of revolution is perpendicular to the axis 116 of the end member 108. Specifically, the side surfaces of each way 110 are conical surfaces with or without ease-off at the profile ends.

There are in this embodiment four like guideways which are equiangularly spaced about the axis 116 of the end member 108. Diametrically opposite guideways are engaged by a pair of coaxial tapered rollers 111. The outside surface of each roller is part of a conical surface whose apex is at O''. Profile ease-off may be used on the rollers if desired. In this case the roller profile in an axial plane recedes very slightly at both ends from the straight line element of the cone; it is slightly convex.

Each roller 111 is mounted on a tapered journal 117 secured to holder 112 or holder 113 by means of a nut 118 threaded onto the end 119 of the journal. Diametrically opposite coaxial rollers 111 are mounted on a common holder or fork. These forks 112, 113 reach over one another. The inner one, 113, is shown particularly in Fig. 9, and an axial section of the outer one, 112, is shown in Fig. 10.

The rollers 111 are pressed outwardly by the load and by centrifugal force. They are secured against inward motion by snap-rings 120.

The two holders 112 and 113, which carry the rollers, are rigid with the two coaxial shafts 102 and 103, respectively. In the embodiment illustrated they are formed integral with the two shafts. The two holders are movable relative to each other about their common axis 105 but are axially fixed relative to each other.

A thin stemmed part 120 with a ball end 121 is threaded into the shaft 103 by thread 122 and is secured therein against rotation by a pin 123. The ball end is movably held in a spherical bearing formed by a part 124 and a nut 125. Part 124 is secured to end member 108. It contains a stem 126 reaching through the center of the end member and secured at its left hand (not shown) to end member 108. To disassemble the drive, the stem 126 is disconnected from the end member 108. The other joint is disconnected at its toothed coupling 98; and the holders 112 and 113 and connecting shafts 102 and 103 are then withdrawn axially of the end member 108 whereby the rollers 111 gradually leave their tapered ways.

Joint 101 differs from the joint described in Figs. 6 to 8 only in that there are two roller holders 75', 75'', which are free to rotate relative to one another about their common axis 125.

In explaining the operation of the universal joint drive shown it is simpler to start from the left end. Uniform motion of end member 108 at shaft angularity causes each of the two roller holders 112 and 113 to turn at a varying rate. However, because of the 90° phase difference of the two roller holders, their average motion is very nearly uniform. Now if the shafts 102 and 103 were to have uniform motion then the roller holders 75 and 75' would turn guideways 81 at varying rates. Because, the two pairs of guideways have a 90° phase difference, however, the average motion of the two pairs of guideways would be very nearly uniform. Actually the shafts 102 and 103 have the motions transmitted to them by the roller holders 112 and 113. The motions of the two shafts, which vary oppositely and substantially equally from uniform motion, must be added then to the opposite and substantially equal variations in motion of the two pairs of guideways 81 to obtain the motion of end member 107. Inasmuch as the variations from uniform motion of shafts 102 and 103 and of the pairs of guideways 81 are both in themselves equal and opposite from uniform motion, and the average of the motion of the shafts and the average of the motion of the two pairs of guideways are both very nearly uniform, the average of their combination also results in practically uniform motion. Hence, practically uniform motion is transmitted from end member 108 to end member 107. Likewise, practically uniform motion is transmitted from end member 107 to end member 108.

The parts shown lend themselves to quantity production. The slots 95 can be broached. The bars 85 can also be broached. The cylindrical guide surfaces 83 of the bars are open at both ends, and they can also be broached and ground without difficulty. Likewise the bars 35 of Figs. 1 to 5 inclusive can be broached to a large extent.

In all embodiments of the invention, I have omitted showing lubricant holders and seals since these form no part of my invention. Any suitable known such means may be used.

While the invention has been described in connection with several different embodiments thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A universal joint for connecting elements with two angularly disposed axes, comprising a plurality of sets of transmission members, each set comprising a guideway and a carrier, a link rigidly secured to one of the two named members of each set, the other named members of said sets being angularly spaced and movable about one of said axes, at least diametrically opposite members of said other named members being rigidly connected to one another, pivots connecting adjacent links, said links forming an endless, closed linkage, means constraining said pivots to move in predetermined paths with respect to the other of said axes, and a member pivotally mounted on each of said carriers and engageable in one of said guideways.

2. A universal joint for connecting two end elements with two angularly disposed axes, comprising four sets of transmission members, each set comprising a guideway and a carrier, a roller mounted on said carrier and engageable in one of said guideways, a link rigid with one member of each set, the other members of said sets being angularly-spaced and movable about one of said axes, at least diametrically opposite other members being rigidly connected to one another, said links constituting an endless closed linkage, pivots connecting adjacent links, and a member coaxial with one of said axes and rigidly connected to the other of said end elements, said last-named member having four slots formed therein radial of the axis of said other end element and adapted to receive and guide said pivots.

3. A universal joint for connecting two elements with angularly disposed and intersecting axes, comprising four sets of transmission members, each set comprising a guideway and a carrier, a roller mounted on each carrier and engageable in one of said guideways, a link rigidly connected to one member of each set, said links constituting a closed four-bar linkage with links of equal length, pivots connecting adjacent links, means constraining said pivots to move in predetermined paths relative to one of said two elements, and the other member of each set being rigid with the other of said two elements.

4. A universal joint for connecting two elements with angularly-disposed and intersecting axes, one of said elements having four radial pivots equi-spaced about the axis of said element, said joint comprising spherical rollers rotatably mounted on said pivots and axially movable thereon, four links having cylindrical guideways thereon in each of which one of said rollers engages, said links being of equal length and pivotally connected at adjacent ends and forming an endless, closed, four-link linkage, the axes of the guideways being parallel to the axes of the links and the axis of each guideway being disposed between the ends of its link, and a member connected to the other of said two elements having radial slots therein for receiving and guiding the link pivots.

5. A universal joint for connecting elements having two angularly disposed and intersecting axes, comprising two pairs of pivots disposed radially of the axis of one of said elements and movable thereabout, the two pivots of each pair being coaxial and rigid with one another, spherical rollers rotatably mounted on said pivots and axially movable thereon, four links having cylindrical guideways therein in each of which one of said rollers engages, said links being of equal length and pivotally connected at adjacent ends by pivot pins and forming an endless, closed, four-link linkage, the axes of said guideways being parallel to the axes of the links, and the axis of each guideway being disposed in line with and between the ends of its link, and means for constraining said pivot pins to move in paths radial of the axis of the other element.

6. In a linkage for universal joints of the character described, an H-shaped bar having a straight guideway, and two pairs of parallel arms projecting from opposite sides of said guideway, said arms extending at right angles to said guideway and being provided with holes in their extremities parallel to said guideway to receive link-connecting pins.

7. In a linkage for universal joints of the character described, an H-shaped bar having a straight guideway which has an internal partially cylindrical guide surface, two pairs of parallel arms projecting at right angles from opposite sides of said guideway, respectively, and forming the legs of said H-shape, said guideway forming the cross-bar of said H-shape, said arms being provided with holes in their extremities parallel to the axis of said guideway the axes of which lie in a plane containing the axis of said guideway and are at equal distances from the axis of said guideway.

8. In a universal joint of the character described, an internal member having four slots radial of its axis, a four-bar linkage with four links of equal length disposed inside of said member, pivots with parallel axes connecting adjacent links, means for guiding said pivots to move along said slots, four sets of transmission parts disposed inside of said member, each set comprising a guideway and a carrier, one of the two last-named parts being rigidly secured to one of said links, and a plurality of members rotatably mounted on said carrier, one of which engages in each of said guideways.

9. In a universal joint of the character described, an internal rotary member having four equi-spaced slots disposed radially of its axis, a four-bar linkage disposed inside of said member and having four bars of equal length, pivots with parallel axes connecting adjacent bars of said linkage, a roller mounted coaxially of each of said pivots and engaging in one of said slots, each bar having a straight guideway with an internal, cylindrical guide surface disposed midway between its pivots and parallel to said pivots, and pivoted means engaging said guideways.

10. In a universal joint of the character described, an outer rotary member having four slots radial of its axis and open at their inner ends, a four-bar linkage having four bars of equal length, pivots with parallel axes connecting adjacent bars of said linkage and engaging in said slots and being guided thereby, each bar having a portion midway between its pivots for mounting a rotatable part, and a guideway engaging each rotatable part.

11. In a universal joint of the character described, an outer rotary member having four slots radial of its axis and open at their inner ends, a four-bar linkage having four bars of equal length, pivots with parallel axes connecting adjacent bars of said linkage and engaging in said slots and being guided thereby, each bar having a spherical portion midway between its pivots, a roller mounted on said portion, and a guideway engaging each roller.

12. In a universal joint of the character described, an outer rotary member having four slots radial of its axis and open at their inner ends, a four-bar linkage having four bars of equal length, pivots with parallel axes connecting adjacent bars of said linkage and engaging in said slots and being guided thereby, each bar having a spherical portion midway between its pivots, a conical roller with a hemispherical recess mounted on said portion, and a guideway with conical sides engaging each roller.

13. In a universal joint of the character described, an outer rotary member having four slots radial of its axis and open at their inner ends, a four-bar linkage having four bars of equal length, pivots with parallel axes connecting adjacent bars of said linkage and engaging in said slots and being guided thereby, each bar having a spherical portion midway between its pivots which has a bore passing through the sphere center of said portion parallel to said pivots, a conical roller mounted on said portion, a pin rockably mounted in said bore, said pin having recessed ends bearing against an end face of said roller, and a guideway with conical sides engaging each roller.

14. A universal joint comprising an outer rotary member having four slots radial of its axis and open at their inner ends, a four-bar linkage having four bars of equal length, pivots with parallel axes connecting adjacent bars of said linkage and engaging in said slots, each bar of said linkage having a spherical portion intermediate its pivots, a tapered roller mounted on said spherical portion, a rotary member having four ways equi-spaced about its axis, which are engaged by said rollers, said ways extending about axes perpendicular to the axis of the last-named member and intersecting the axis of said last-named member in the same point, and means for preventing axial displacement of said point relative to said outer member.

15. A universal joint comprising an outer rotary member with four slots radial of its axis and open at their inner ends, a four-bar linkage having four bars of equal length, pivots with parallel axes connecting adjacent bars of said linkage and engaging in and guided by said slots, a connecting member rotatably mounted on each bar of said linkage at a point intermediate its pivots, and a member having four guideways equi-spaced about an axis, which engage said connecting members.

16. A universal joint drive with two spaced universal joints, comprising a rotatable end member with an enlarged head that has four tapered grooves therein extending about axes perpendicular to the axis of said end member and intersecting said axis in the same point, two carriers rotatably mounted on one another for relative rotary movement about a common axis, a pair of rollers mounted on each of said carriers, said rollers engaging in said grooves, means for preventing axial displacement between said head and carriers, an inner shaft rigid with one of said carriers, an outer shaft rigid with the other carrier and coaxial with the inner shaft, said carriers being disposed at one end of said shafts, a roller carrier rigid with the opposite end of each shaft, two pairs of rollers rotatably mounted on the last-named roller carriers, a four-bar linkage having four bars of equal length, pivots connecting adjacent bars of said linkage, a straight guideway carried by each bar and engaging one roller of the last-named two pairs of rollers, said guideways being parallel to said pivots and an outer rotary member rigid with the other end member of the drive, said outer member having four radial slots therein holding said pivots while permitting radial motion thereof.

17. A universal joint drive with two spaced universal joints, comprising a rotatable end member with an enlarged head and having four tapered grooves therein, said grooves extending about axes perpendicular to the axis of said end member and intersecting said axis in the same point, two carriers rotatably mounted on one another for relative rotation about a common axis, a pair of tapered rollers rotatably mounted on each of said carriers, said rollers engaging in said grooves, means preventing axial displacement between said head and carriers, inner and outer coaxial shafts rigidly connected, respectively, to said two carriers, said carriers being disposed at one end of said shafts, two other carriers rigid, respectively, with said two shafts at the other ends thereof, a pair of spherical rollers rotatably mounted on each of the two last-named carriers, a four-bar linkage having bars of equal length, pivots connecting adjacent bars of said linkage, each bar having a straight guideway which has an internal, cylindrical guide surface that engages one of said spherical rollers, each guideway being parallel to the pivots and disposed midway between the pivots that connect a bar with adjacent bars, and an outer rotary member rigid with the other end member of the drive, said outer member having four slots therein radial of its axis of rotation, engaging said pivots while permitting radial motion thereof.

18. A universal joint comprising a pair of end members, a plurality of links constituting an endless, closed linkage, a member rigid with each link and having a spherical portion, a roller mounted on each said spherical portion, a plurality of guideways, each of which receives and guides one of said rollers, means pivotally connecting adjacent links, and means for constraining and guiding said pivot means radially of the axis of one end member.

19. A universal joint comprising two end members rotatable about different axes, a roller carrier rigid with one of said end members, a plurality of rollers mounted on said carrier for rotation about axes radial of the axis of said carrier, a plurality of links constituting an endless, closed linkage surrounding the axis of said one end member, a guideway on each of said links for receiving and guiding one of said rollers, means pivotally connecting adjacent links, and means connected to the other end member for constraining and guiding said pivot means to move radially of the axis of one end member.

20. A universal joint comprising two end members having angularly disposed axes, a plurality of pivot members and a plurality of guideways, a plurality of links constituting an endless, closed linkage, one of each of the first two pluralities of parts being rigid with each link and one of each of the other of said first two pluralities of parts being rigidly connected to one of said end members, a roller journaled on each pivot member and engaging in one of said guideways, pivot pins connecting adjacent links, and means rigid with the other end member for constraining and guiding said pivot pins to move radially of the axis of one end member.

21. A linkage for universal joints comprising a plurality of identical links pivotally connected to one another at adjacent ends, each link having a spherical portion intermediate its ends and bifurcated parts projecting at opposite sides beyond said spherical portion in the direction of length of the link, the furcations of one of said bifurcated parts being spaced apart a sufficient distance to receive between them the furcations of the other of said bifurcated parts of the next adjacent link, said links having parallel holes in the ends of the furcations to receive connecting pivot pins.

22. A linkage for universal joints comprising a plurality of identical links pivotally connected to one another at adjacent ends, and pins connecting said ends, each link having a straight guideway formed in it between its ends parallel to the axes of said pins.

ERNEST WILDHABER.

References Cited in the file of this patent

UNITED STATES PATENTS

| Number | Name | Date |
|---|---|---|
| 1,498,678 | Chavrier | June 24, 1924 |
| 1,941,908 | Martinto | Jan. 2, 1934 |

FOREIGN PATENTS

| Number | Country | Date |
|---|---|---|
| 250,987 | Switzerland | 1948 |